Figure 1:
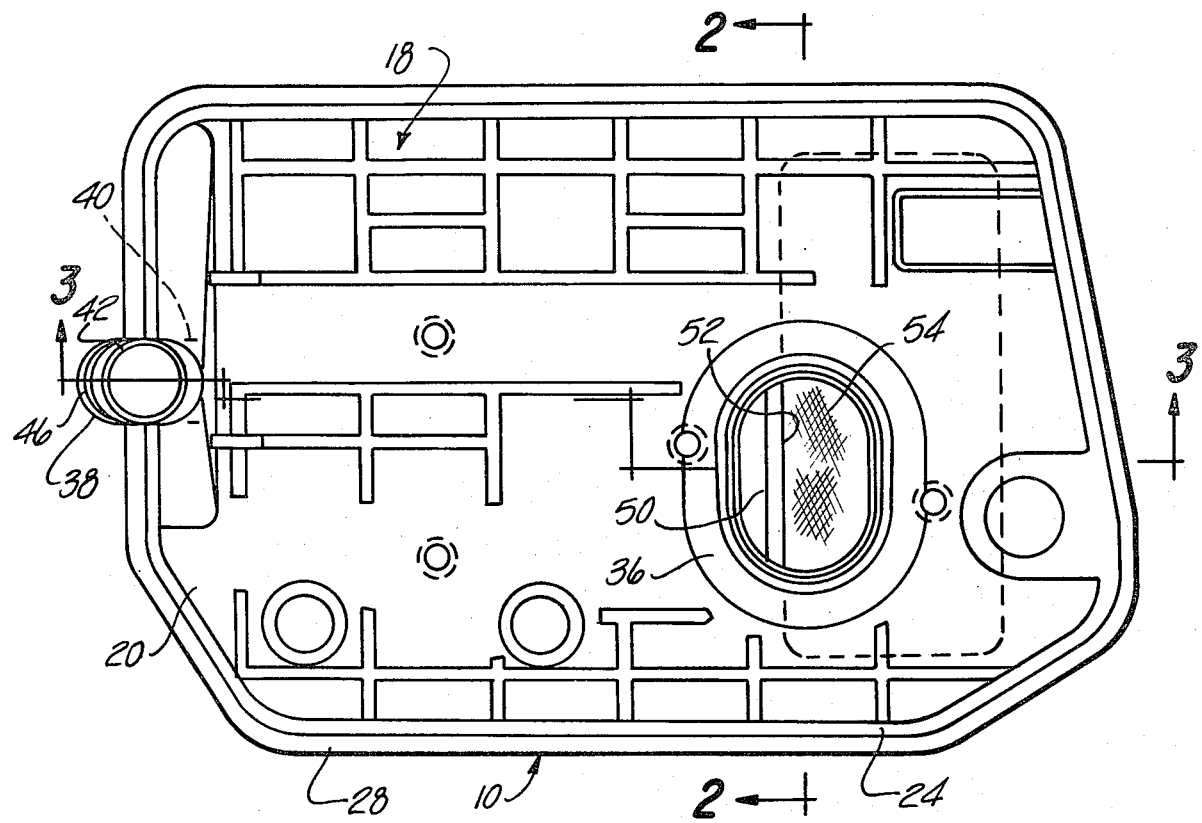

United States Patent [19]

Joseph

[11] 4,402,827
[45] Sep. 6, 1983

[54] TRANSMISSION FLUID FILTER

[75] Inventor: A. David Joseph, North Muskegon, Mich.

[73] Assignee: Sealed Power Corporation, Muskegon, Mich.

[21] Appl. No.: 284,931

[22] Filed: Jul. 20, 1981

Related U.S. Application Data

[63] Continuation of Ser. No. 167,698, Jul. 11, 1980, abandoned.

[51] Int. Cl.³ .............................................. B01D 39/08
[52] U.S. Cl. ................................... 210/314; 210/168; 210/445; 210/452; 210/455; 210/461; 210/486; 210/504; 210/507
[58] Field of Search ............... 210/132, 137, 167, 168, 210/416 L, 451, 484, 503, 504, 505, 507, 508, 315, 483, 486, 459, 460, 461, 314, 445, 452, 455

[56] References Cited

U.S. PATENT DOCUMENTS

| | | | |
|---|---|---|---|
| 2,559,267 | 7/1951 | Winslow | 210/484 |
| 2,850,168 | 9/1958 | Nostrand | 210/484 |
| 3,023,906 | 3/1962 | Moore | 210/484 |
| 3,384,241 | 5/1968 | Nostrand | 210/315 |
| 3,406,832 | 10/1968 | Ruschman | 210/484 |
| 3,497,065 | 2/1970 | Johnson, Jr. | 210/508 |
| 3,504,800 | 4/1970 | Niebergall | 210/484 |
| 4,056,476 | 11/1977 | Mouwen et al. | 210/507 |
| 4,136,011 | 1/1979 | Joseph et al. | 210/168 |
| 4,187,136 | 2/1980 | Nostrand | 210/489 |

FOREIGN PATENT DOCUMENTS 249690  2/1964  Australia ............................. 210/168

Primary Examiner—Ernest G. Therkorn
Attorney, Agent, or Firm—Barnes, Kisselle, Raisch, Choate, Whittemore & Hulbert

[57] ABSTRACT

In the fluid circulation system of a transmission having a prespecified minimum operating temperature and a minimum fluid flow requirement for operation at the minimum operating temperature, a transmission fluid filter comprising a housing having a fluid inlet and outlet, and a filter element supported in the housing. The filter element is a composite assembly of a fine filtering medium such as a phenolic resin-impregnated felt having an opening therein, and a coarse filtering media such as polyester mesh secured over the opening so as to provide through the respective media parallel continuous fluid flow paths. The surface area ratio of coarse to fine filter media is the minimum ratio sufficient to permit minimum flow through the coarse filtering media at the prespecified minimum operating temperature.

2 Claims, 4 Drawing Figures

TRANSMISSION FLUID FILTER

This is a continuation of application Ser. No. 167,698, filed July 11, 1980, now abandoned.

TRANSMISSION FLUID FILTER

The present invention relates to transmission fluid filters, and more particularly to continuous flow filters for transmissions having a prespecified minimum operating temperature.

It is conventional in transmission for medium size automobiles to provide a transmission fluid filter having a filter medium consisting of a mesh or screen of natural or synthetic fibers or metal wire, for example. Such filter media are capable of filtering particles having a 130 micron particle mean size or diameter, and have been utilized satisfactorily for a number of years. However, the present trend towards "downsizing" of automobiles, including the transmission structure, requires more efficient filtration down to a particle size on the order of 60 microns, for example. Filter media have been proposed for enhanced filtering of particles in the transmission fluid down to the lesser particle size. However, under cold weather starting and operating conditions wherein the transmission fluid is substantially thickened, little fluid will flow through such felt filter media, which prevents proper shifting and operating of the transmission.

An object of the present invention is to provide a transmission fluid filter which provides minimum fluid flow needed for proper operation of the transmission at a minimum operating temperature prespecified by the transmission manufacturer, and which also under normal operating conditions provides enhanced filtering efficiency as compared with mesh and screen filters characteristic of the commercial prior art.

Figure 2:
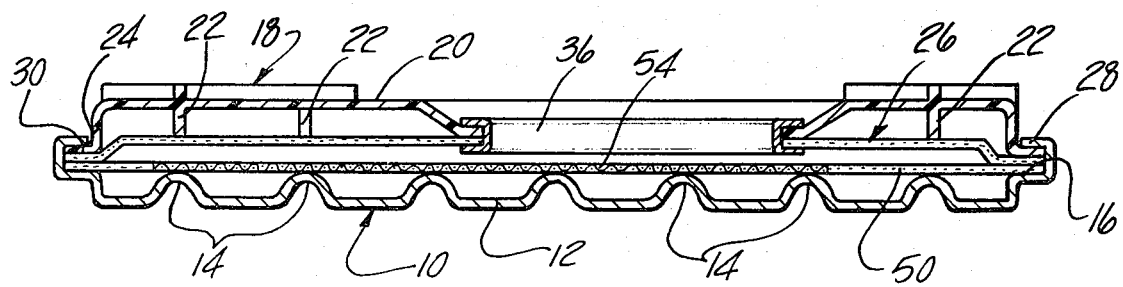
Figure 3:
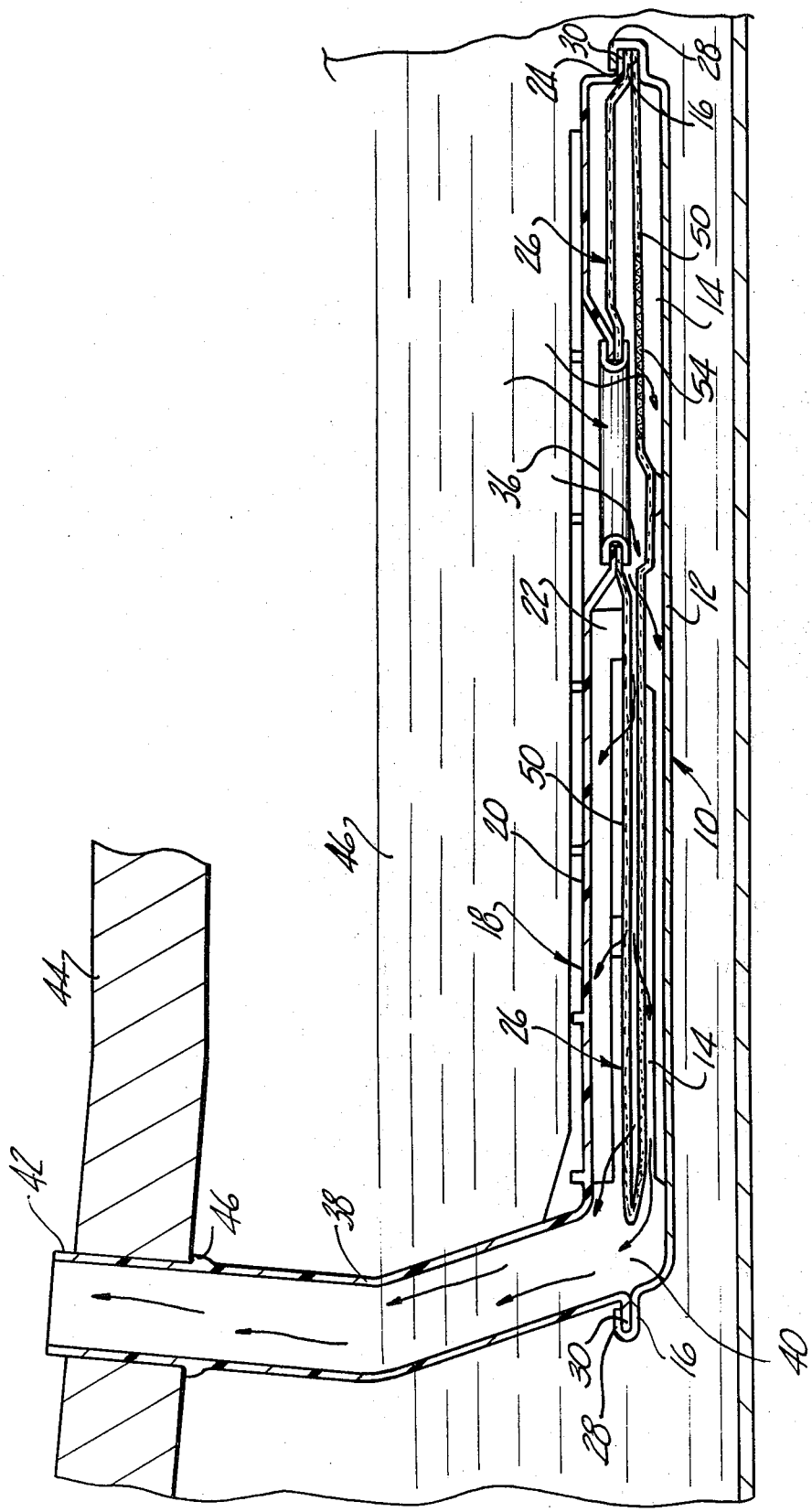
Figure 4:
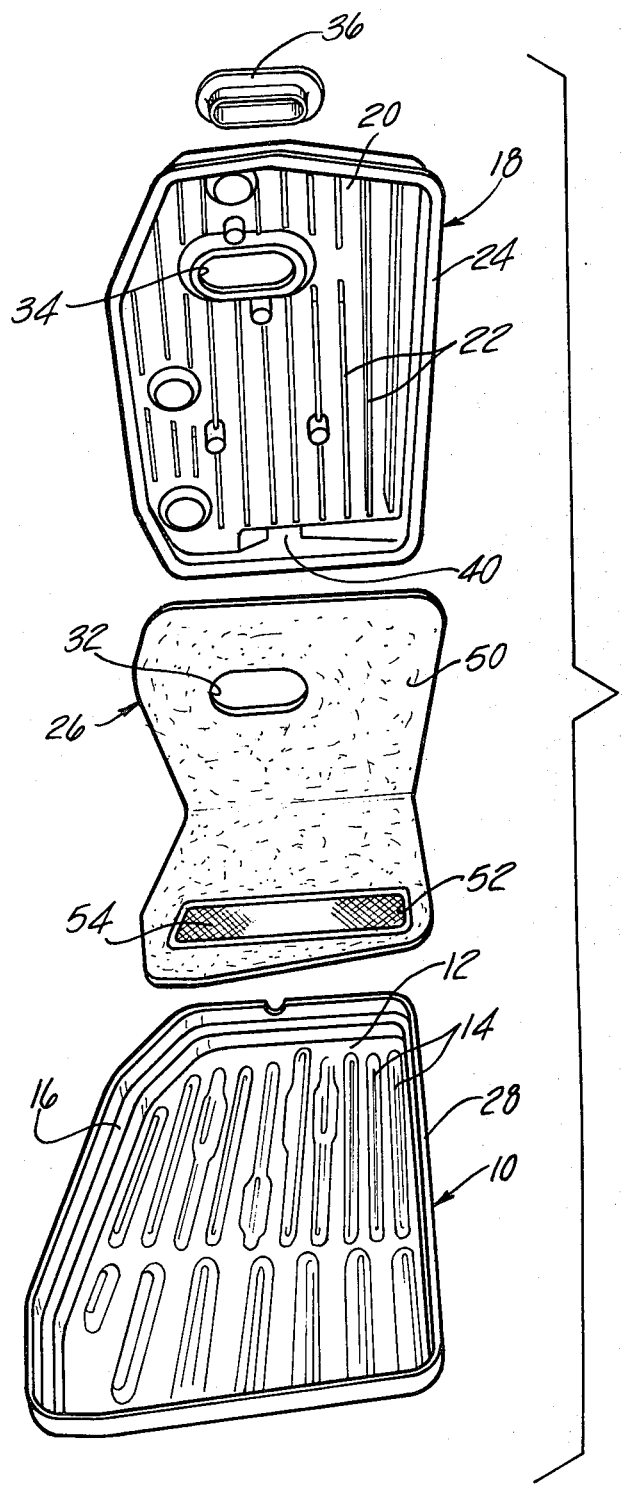

The invention, together with additional objects, features and advantages thereof, will be best understood from the following description, the appended claims and the accompanying drawings in which:

FIG. 1 is a top plan view of one embodiment of a transmission fluid filter in accordance with the invention;

FIGS. 2 and 3 are sectional views taken along the respective lines 2—2 and 3—3 in FIG. 1; and FIG. 4 is an exploded elevational view of the transmission fluid filter shown in FIGS. 1-3.

Referring to the drawings, one embodiment of a transmission fluid filter in accordance with the invention illustrated therein comprises a base pan 10 having a generally flat bottom wall 12 with a plurality of longitudinally extending parallel bosses or ribs 14 upstanding therefrom. A peripheral ledge 16 extends around base pan 10 and is spaced from the plane of wall 12. A cover 18 comprises a generally flat wall 20 and a plurality of longitudinally extending parallel ribs 22 integrally depending therefrom. A peripheral ledge 24 surrounds cover 18 and is spaced from the plane of cover wall 20, as best shown in FIGS. 2 and 3. A filter element 26 in the form of an elongated generally rectangular sheet is folded across its narrower dimension or width and disposed between cover 18 and base pan 10, with the three non-folded edges of filter element 26 extending around pan ledge 16. A flange 28 integrally extending from pan ledge 16 is crimped in sealing engagement over a lip 30 extending radially from cover ledge 24 so as to capture the filter element and cover in assembly against the pan ledge.

An inlet opening 32 (FIG. 4) in filter element 26 is aligned with a corresponding inlet opening 34 in cover wall 20, and is sealingly fastened thereto by a circumferentially continuous eyelet 36. A lift pipe 38 extends upwardly from an outlet opening 40 in cover 18 and is adapted at a cover-remote end 42 to be press fitted into the fluid inlet opening of a transmission fluid pump 44. An annular lip 46 surrounds lift pipe 38 on an outer surface thereof so as to limit insertion of the lift pipe into pump housing 44. Lift pipe 38 thus serves the dual purposes of coupling outlet opening 40 of the transmission fluid filter to the pump housing 44 and of suspending the filter in a transmission fluid pump illustrated schematically at 46 in FIG. 3. As illustrated by the directional arrows in FIG. 3, transmission fluid is drawn in operation through eyelet 36 into the region between the folded and sandwiched planar sections of filter element 26, and then through the filter media into the respective cavities formed between the filter media and walls 12, 20. The filtered fluid then passes between base support ribs 14 and cover ribs 22 (which also serve to support the planar filter sections against suction from pump 44) to outlet opening 40, up lift pipe 38 and into the fluid pump housing. Preferably, base pan 10 is provided in the form of a sheet metal stamping. Cover 18 and lift pipe 38 are provided as an integrally molded assembly of fiber-reinforced polyamide (nylon).

In accordance with the present invention, filter element 26 comprises a composite assembly including a fine first filter medium 50 in sheet form having an opening or aperture 52 in its filtering surface, and a coarse second filtering medium 54 secured to medium 50 over opening 52. Media 50, 54 provide separate continuous parallel flow paths for transmission fluid entering eyelet 36. As will be evident, the amount of fluid flowing through the parallel filter media 50, 54 will depend upon the resistance to fluid flow through the respective media which, in turn, is dependent in part upon fluid viscosity and temperature. In accordance with an important feature of the present invention, the surface area ratio of coarse filter medium 54 to fine filter medium 50 is empirically selected as the minimum ratio sufficient to permit minimum flow of transmission fluid required for operation of the transmission at a particular minimum operating temperature prespecified by the transmission manufacturer. Stated differently, the surface area or amount of coarse filter medium 54 is the minimum necessary to provide minimum required fluid flow at prespecified minimum operating temperature, and the remainder of filter element 26 is the more efficient fine filter medium 50. This surface area ratio is presently determined by operating a transmission at the prespecified minimum operating temperature and varying the ratio of coarse to fine filter media until minimum fluid flow is obtained.

Preferably, coarse filter medium 54 comprises a screen of polyester monofilament woven in a 120×120 mesh and having a 130 micron minimum particle size retention capability. Fine filter medium 50 comprises a phenolic resin-impregnated polyester felt having a 60 micron minimum particle size retention capability. In the particular filter shown in the drawings, coarse filter 54 occupies about 15% of the total filter surface area. This particular construction was found empirically to provide minimum flow requirements at a temperature −30° F. for a particular model transmission.

It will be recognized that the particular filter assembly illustrated in the drawings is adapted for use in a particular transmission assembly. The invention, however, may be embodied in other types of filter structures for use in other transmission models without departing from the scope thereof. Two additional filter assembly structures in which the invention may be utilized are illustrated in U.S. Pat. No. 4,136,011 assigned to the assignee hereof. Similarly, filter media other than polyester mesh and resin-impregnated polyester felt may be utilized where greater or lesser filtering efficiency are desired. Similarly, the ratio of coarse to fine filter surface area in the composite filter element in accordance with the invention will vary as a function of filter structure, transmission type and minimum specified operating temperature, as previously described.

The invention claimed is:

1. A transmission fluid filter comprising a pair of generally rectangular cup-shaped pan members having peripheral edges fastened in opposed relation and respective generally flat base walls spaced from each other to form an enclosed volume, spacer means integral with each of said pan member base walls and projecting into said volume, one of said pan members having an inlet opening formed in the associated said base wall, a filter element comprising a generally rectangular sheet of resin-impregnated felt having uniform thickness and a 60 micron nominal minimum particle retention capability, said sheet being folded upon itself with three non-folded edges sealingly captured between three said opposed peripheral edges of said pan members such that the folded edge of said sheet is disposed within said volume and spaced from the opposed fourth peripheral edges of said pan members, with facing sections of said folded sheet being supported in generally planar orientation by said spacer means to define spaced cavities between said sheet sections and opposing base walls of said pan members, said sheet having a first through opening sealingly fastened surrounding said inlet opening to admit fluid to within said folded sheet between said opposing sheet portions, said sheet slso having a second through opening, said filter element further comprising a section of monofilament woven screen having a 120×120 mesh size and a 130 micron nominal minimum particle size retention capability, said screen section being secured over said second through opening in said sheet to provide separate and distinct parallel and continuous flow paths for passage of fluid from within said folded sheet to said spaced cavities respectively through said felt sheet and said screen section, with fluid that flows through said screen section bypassing said felt sheet, and outlet means carried by said pan members and opening into the space between said folded edge of said sheet and said opposed fourth peripheral edges of said pan members, said outlet means being in fluid communication with said spaced cavities.

2. The transmission fluid filter set forth in claim 1 wherein said second through opening occupies about 15% of the total surface area of said felt sheet.

* * * * *